United States Patent
Fujiki

[11] Patent Number: 5,943,138
[45] Date of Patent: Aug. 24, 1999

[54] GROUP 4 FACSIMILE ADAPTER

[75] Inventor: Hitoshi Fujiki, Kyoto, Japan

[73] Assignee: Murata Kikai Kabushiki Kaisha, Kyoto, Japan

[21] Appl. No.: 09/089,909

[22] Filed: Jun. 3, 1998

[30] Foreign Application Priority Data

Jun. 9, 1997 [JP] Japan ..................... 9-151393

[51] Int. Cl.$^6$ .................. H04N 1/00; H04N 1/32
[52] U.S. Cl. ............ 358/407; 358/442; 358/436
[58] Field of Search ................... 358/400, 401, 358/407, 405, 479, 406, 468, 442, 434, 435, 436, 438, 439; 379/100.01, 100.06, 100.12, 100.13; 370/110.01

[56] References Cited

U.S. PATENT DOCUMENTS 4,961,185 10/1990 Sawada ........................ 370/79
5,042,028 8/1991 Ogawa ........................ 370/58.2
5,050,005 9/1991 Kagami ........................ 358/434
5,189,525 2/1993 Kotani ........................ 358/407

*Primary Examiner*—Jerome Grant, II
*Attorney, Agent, or Firm*—Loeb & Loeb LLP

[57] ABSTRACT

The Group 4 facsimile adapter connected to a facsimile machine that performs Group 3 facsimile communication. The Group 4 facsimile adapter includes an interface to a digital data line or network, a Group 4 facsimile communication unit, an audio signal CODEC connected to the digital data line via the interface for converting between analog audio signals and digital data, and a network control unit for controlling an analog line. The Group 4 facsimile adapter is not be provided with a Group 3 modem of its own, and can instead use a Group 3 modem of the existing Group 3 facsimile machine when Group 3 facsimile communication is performed.

9 Claims, 7 Drawing Sheets

GROUP 4 FACSIMILE ADAPTER

BACKGROUND OF THE INVENTION

1. Field of the Invention

The present invention relates to a facsimile adapter, and specifically to a facsimile adapter for adding Group 4 ("G4": International Telecommunications Union (ITU-)-T recommendation T.6) capability to an existing facsimile machine provided with Group 3 ("G3": ITU-T recommendation T.4) capability.

2. Description of the Related Art

Currently, common facsimile communication is G3 communication whereby digital facsimile data is converted to analog audio signals by a modem, and transmitted over a common public telephone line. G4 facsimile communication whereby a digital data line, or more specifically an ISDN (Integrated Services Digital Network), is used to transmit digital data in digital form is growing. In order to perform G4 facsimile communication, a dedicated facsimile machine (typically, such a machine is also capable of performing G3 facsimile communication, as well) is generally purchased, but an adapter (a G4 facsimile adapter) is also available to add G4 communication capability to a conventional G3 facsimile machine.

An example of the essential structure of a conventional G4 facsimile adapter which is attached to an existing facsimile machine with G3 capability will be described below in reference to FIG. 7 of the accompanying drawings.

In FIG. 7, a reference numeral 100 designates a facsimile machine with G3 capability to which a G4 facsimile adapter 110 is connected by buses. In other words, the data bus 103 of the existing G3 facsimile machine 100 and the data bus 25 of the G4 facsimile adapter 110 are connected. A reference numeral 2 denotes an ISDN (digital data line), and 3 denotes a public switched telephone network (a normal analog audio line or network).

Since the structure of the G3 facsimile machine 100 is known, only G3 modem 101 and NCU (Network Control Unit) 102 are shown in FIG. 7. When the facsimile machine 100 transmits data to a remote device (not shown), digital facsimile data generated from an element (not shown) is converted into analog audio signals by G3 modem 101. These audio signals are transmitted to the public switched telephone network 3 by NCU 102. Further, when the facsimile machine 100 receives data, NCU 102 receives analog audio signals from the public switched telephone network 3, and these signals are converted to digital facsimile data by G3 modem 101.

The G4 facsimile adapter 110 is comprised of an ISDN interface unit 11 which provides interface capability with the ISDN 2, an audio signal CODEC unit 12 which converts between analog signals and digital data, a G3 modem 16 which converts between facsimile data and audio signals, a G4 facsimile unit 20, and CPU 13 which controls the entire structure.

The ISDN interface unit 11 includes an S-interface function and an LAP-D (Link Access Procedure on D-Channel) function. S-interface means S-point interface, and includes protocol processing capability, maintenance capability, and interface capability. LAP-D function controls the protocol for ISDN channel D.

The G4 facsimile unit 20 is comprised of LAP-B (Link Access Procedure Balanced mode) unit 21, EP-ROM 22 and S-RAM 23, all of which are attached to the data bus 25 connecting the ISDN interface unit 11 and the G3 facsimile machine 100.

The LAP-B unit 21 controls the protocol for ISDN channel B, and actually transmits the data. EP-ROM 22 and S-RAM 23 are used for storage of programs used by the CPU 13, control data, intermediary data, and the like.

The conventional G4 facsimile adapter 110 is designed to be connected to the data bus 103 of the existing G3 facsimile machine 100. Even when G3 facsimile communication utilizes ISDN, the G4 adapter's G3 modem 16 is used instead of the G3 modem 101 of the existing G3 facsimile machine 100. Since this creates the obvious necessity of changing the G3 communication originally adapted to the existing G3 facsimile machine 100, the associated software must be changed.

Furthermore, the operation performed by the user also must change in order to use the G3 modem 16 of the G4 facsimile adapter 110 even when the user utilizes the existing G3 facsimile machine 100 to perform G3 facsimile communication. This can cause difficulties for the user. Further still, since the G3 modem 16 of the G4 adapter 110 must be used instead of the G3 modem 101 already provided on the existing G3 facsimile machine 100, the G3 modem 101 provided on the existing G3 facsimile machine 100 becomes useless. Put in another way, if the G3 modem 101 already provided in the existing G3 facsimile machine 100 could be used instead of providing a G3 modem 16 in the G4 adapter 110, it would be possibly to reduce the manufacturing costs of the G4 adapter 110.

Japanese Patent Application, Laid-Open Publication No. 8-331296 discloses a system which simply combines a G3 facsimile machine with a G4 facsimile machine.

SUMMARY OF THE INVENTION

It is an object of the present invention to provide a G4 facsimile adapter that has no G3 modem and solves the above-described problems of the conventional technology.

The G4 facsimile adapter according to the present invention is connected to a facsimile machine that performs G3 facsimile communication, and includes an interface unit for interfacing with the digital data line (or network), a G4 facsimile communication unit, an audio signal CODEC connected to the digital data line via the interface unit for converting between analog audio signals and digital data between the audio signal CODEC and the digital data line, and a network control unit for controlling the analog line. The G4 facsimile adapter of the present invention need not be provided with a G3 modem of its own, and can instead use a G3 modem of the existing G3 facsimile machine when G3 facsimile communication is performed. Therefore, the G3 communication procedures of the existing G3 facsimile machine (in other words, the software of the existing G3 facsimile machine) does not need to be updated, and the user of the G3 facsimile machine does not have to perform any special operation in order to perform G3 facsimile communication from the existing G3 facsimile machine. Further, the G3 modem provided in the existing G3 facsimile machine does not become useless, and the manufacturing cost of the G4 facsimile adapter can be reduced.

The network control unit may include a ring signal generating means, an off-hook detection means, and a dial signal detection means.

The G4 facsimile communication unit may be connected directly to the data bus of the G3 facsimile machine.

DETAILED DESCRIPTION OF THE INVENTION

A first embodiment of the G4 facsimile adapter of the present invention will be described below with reference to FIGS. 1 through 3.

Figure 1:
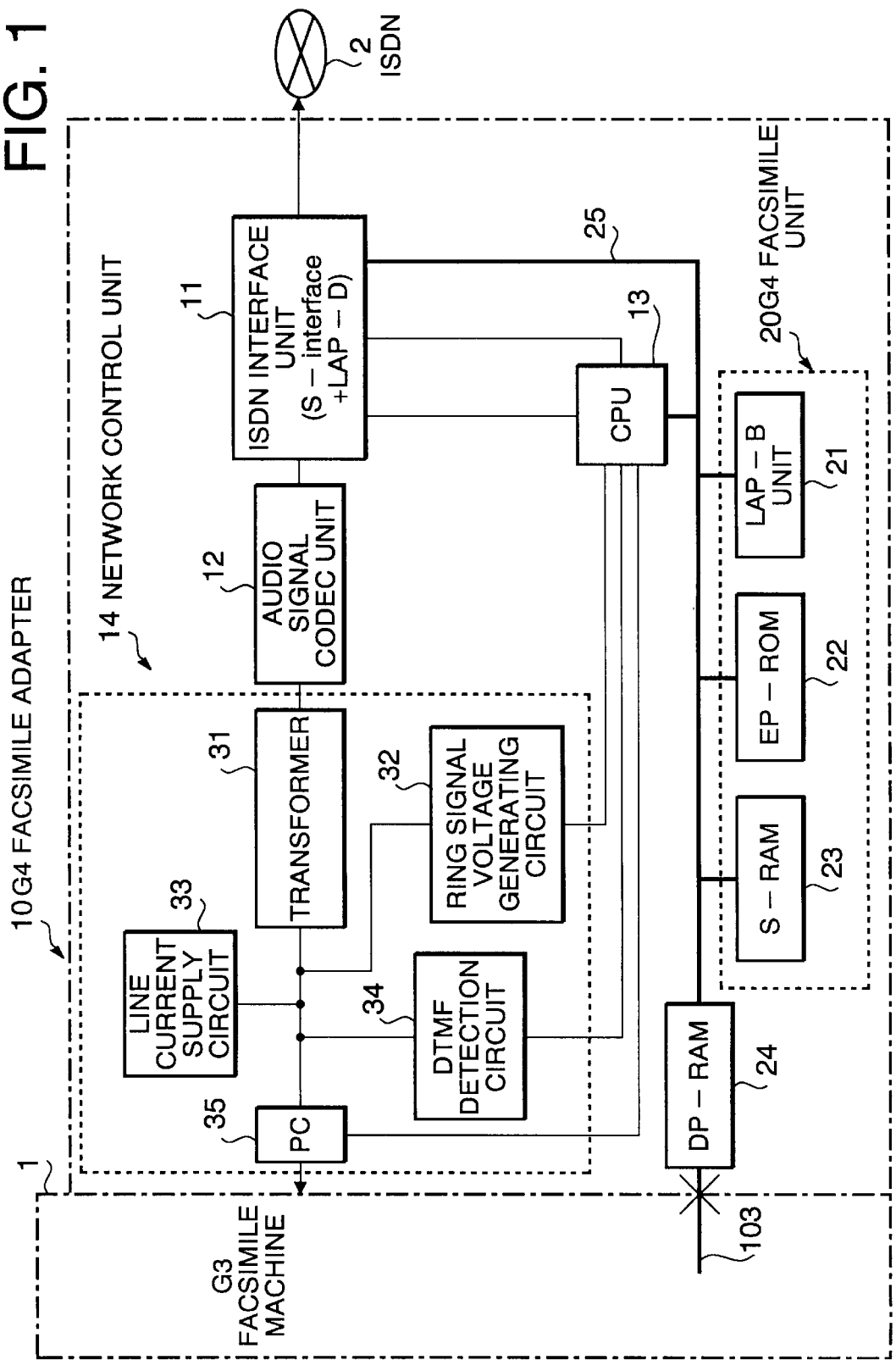
FIG. 1 is a block diagram showing the main structure of the G4 facsimile adapter of the present invention and the existing G3 facsimile machine to which it is connected.
Figure 2:
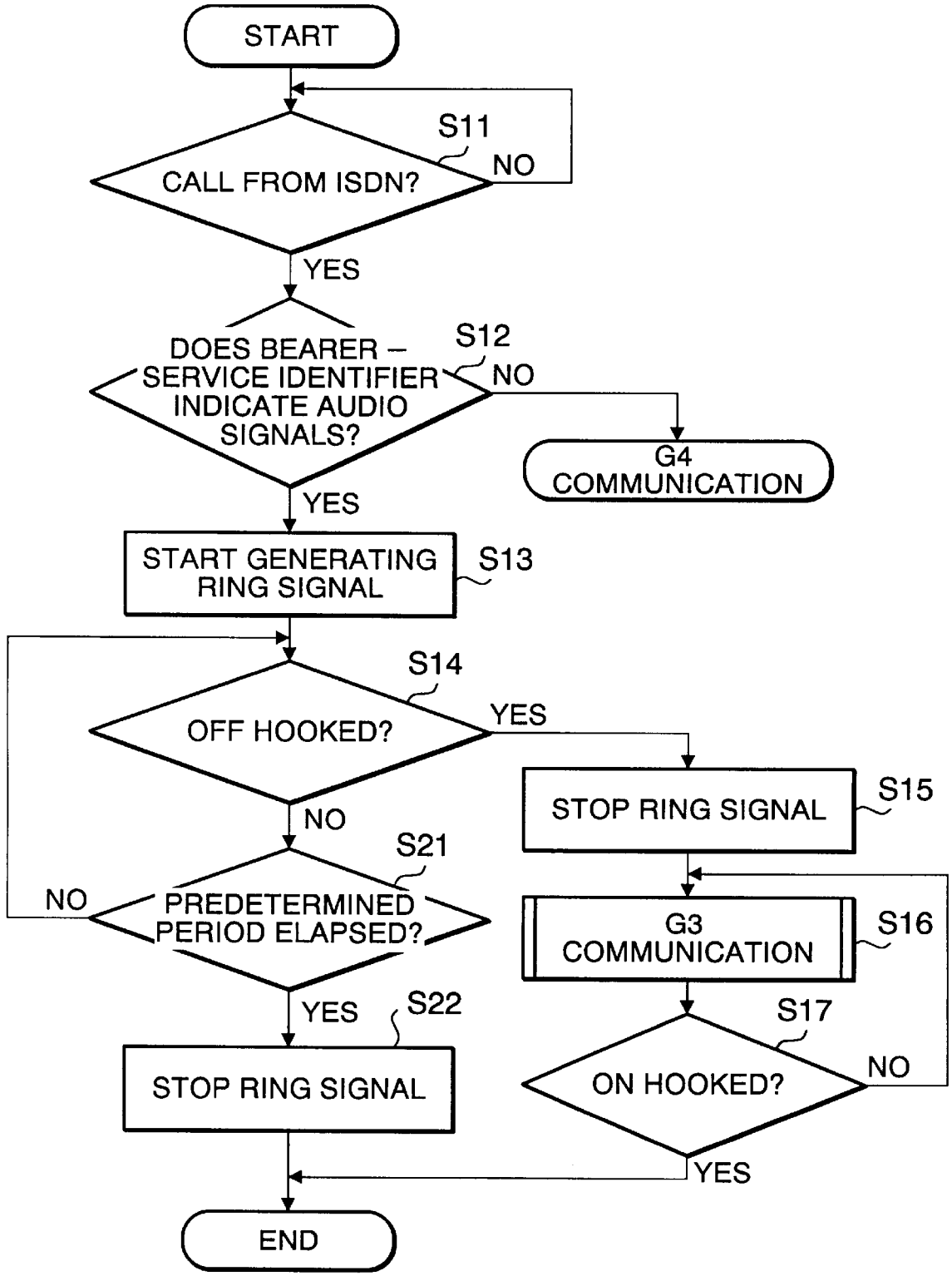
FIG. 2 is a flow chart showing the operating procedure when data is received via G3 facsimile communication through the G4 facsimile adapter of the present invention.

Referring to FIG. 1, illustrated is a block diagram of a G4 facsimile adapter 10 and the existing G3 facsimile machine 1 to which it is connected. The data bus 25 of the G4 adapter 10 of the present embodiment is directly connected to the data bus 103 of the existing G3 facsimile machine 1. A reference numeral 2 designates an ISDN (digital data line).

The G4 facsimile adapter 10 of the present embodiment is principally comprised of Network Control Unit 14, an ISDN interface unit 11 which provides interface capability with the ISDN 2, an audio signal CODEC (coder and decoder) 12 which converts between analog audio signals and digital data, a G4 facsimile unit 20, and CPU 13 which controls the components of the adapter 10. A reference numeral 24 designates a dual-port RAM (DP-RAM) which serves to buffer digital data transmitted and received between the G3 facsimile machine 1 and the G4 facsimile adapter 10 of the illustrated embodiment.

The ISDN interface unit 11 is comprised of an S-interface unit and an LAP-D (Link Access Procedure on D-Channel) unit. The S-interface is an s-point interface, and includes protocol processing capability, maintenance capability, and interface capability. LAP-D controls the protocol used for D channel of ISDN.

The G4 facsimile unit 20 is comprised of LAP-B (Link Access Procedure Balanced mode) unit 21, EP-ROM 22 and S-RAM 23, all of which are connected to the data bus 25.

The LAP-B unit 21 controls protocol on ISDN B channel, and performs the actual data communication. EP-ROM 22 and S-RAM 23 are used for storing programs for CPU 13, data used in control, intermediary data, and the like.

Network Control Unit 14 is provided with a transformer 31 and a photo-coupler (PC) 35 arranged on a line connecting the audio signal CODEC unit 12 and the G3 facsimile machine 1. A circuit for generating a voltage for ring signal 32, a DTMF (dial tone multi-frequency) detection circuit 34, and a line current supply circuit 33 are connected to the line that joins the transformer 31 and the photo-coupler 35.

The transformer 31 distributes the line current to the voice signal CODEC 12 and the G3 facsimile machine 1. The voltage signal generating circuit 32 functions as a ring signal generating means, and generates a ring signal (bell sound) under the control of CPU 13 when a call arrives. DTMF detection circuit 34 functions as a dial signal detection means, and detects a DTMF tone and inputs it to the CPU 13 when a call to a remote facsimile machine is made. The line (or network) current supply circuit 33 supplies a current required by the telephone line or network. The photo-coupler 35 functions as the off-hook detection means, and along with detecting an off-hook state of G3 facsimile machine 1, also detects a dial pulse when a call to a remote facsimile machine is made by a dial pulse, and passes it to the CPU 13. In the description below, the G3 facsimile machine 1 makes a call using DTMF dialing method.

In this G4 facsimile adapter 10 of the present embodiment, when sending data, DTMF detection circuit 34 detects the telephone number dialed by the G3 facsimile machine 1, and inputs it to the CPU 13. CPU 13 then utilizes the LAP-D unit of the ISDN interface unit 11 and makes a call over ISDN 2. In the case of G3 communication, the facsimile data is transmitted from the G3 facsimile machine 1 to ISDN 2 through the transformer 31, the audio signal CODEC 12 and the ISDN interface unit 11.

In the case of G4 communication, data is sent and received between the G3 facsimile machine 1 and the ISDN interface unit 11 via the G4 facsimile unit 20, during which the facsimile data packets are analyzed and constructed by LAP-B unit 21.

Next, the operation of G3 facsimile data reception using the G4 facsimile adapter 10 of this particular embodiment will be described in reference to the flow chart in FIG. 2.

First, if a call is received from ISDN 2 (Step S11 YES), then CPU 13 checks for a bearer-service identifier (Step S12) to determine whether or not the incoming data is in the form of audio signals. Specifically, it is determined that an audio signal is sent from the network if a bearer capability is a 3.1 kHz audio signal or a voice is detected. On the other hand, if the bearer capability is unrestricted, the incoming call is determined to be G4 signals. As a result of the determination at step S12, if the received signal is determined to be a signal other than audio signals (Step S12 NO), then it is treated as G4 facsimile communication and processed by CPU 13 at G4 facsimile unit 20.

If it is determined at step S12 that the call is in audio signals (Step S12 YES), then it is treated as G3 facsimile communication, and CPU 13 sends a control signal to the ring signal (bell sound) generating circuit 32 to generate a ring signal (Step S13).

Next, CPU 13 determines whether the G3 facsimile machine 1 is in an off-hook condition or not (Step S14). If the G3 facsimile machine 1 is off-hooked (Step S14 YES) (in other words, if the G3 facsimile machine 1 is set to an automatic facsimile reception mode and in a fax stand-by condition or a telephone-fax stand-by condition and automatically off hooks upon receiving the call or if the G3 facsimile machine 1 is set to a manual reception mode and in a telephone stand-by condition and is off-hooked manually), CPU 13 terminates the ring signal generated from the ring generating circuit 32 (Step S15), and conducts G3 facsimile communication with the G3 facsimile machine 1 (Step S16). This G3 facsimile communication is performed while the G3 facsimile machine 1 is continuously in an off-hook state. When the G3 facsimile machine 1 returns to an on-hook state (Step S17), ISDN communication is terminated.

On the other hand, if the G3 facsimile machine 1 is in an on-hook state at step S14, CPU 13 terminates the ring signal generated by ring signal generating circuit 32 (Step S22) after the predetermined time limit is reached (Step S21 YES). If G3 facsimile machine 1 is not set to automatic reception mode (in other words, if it is set to dedicated telephone reception), then facsimile reception will not be able to proceed as long as a manual procedure is not performed.

Figure 3:
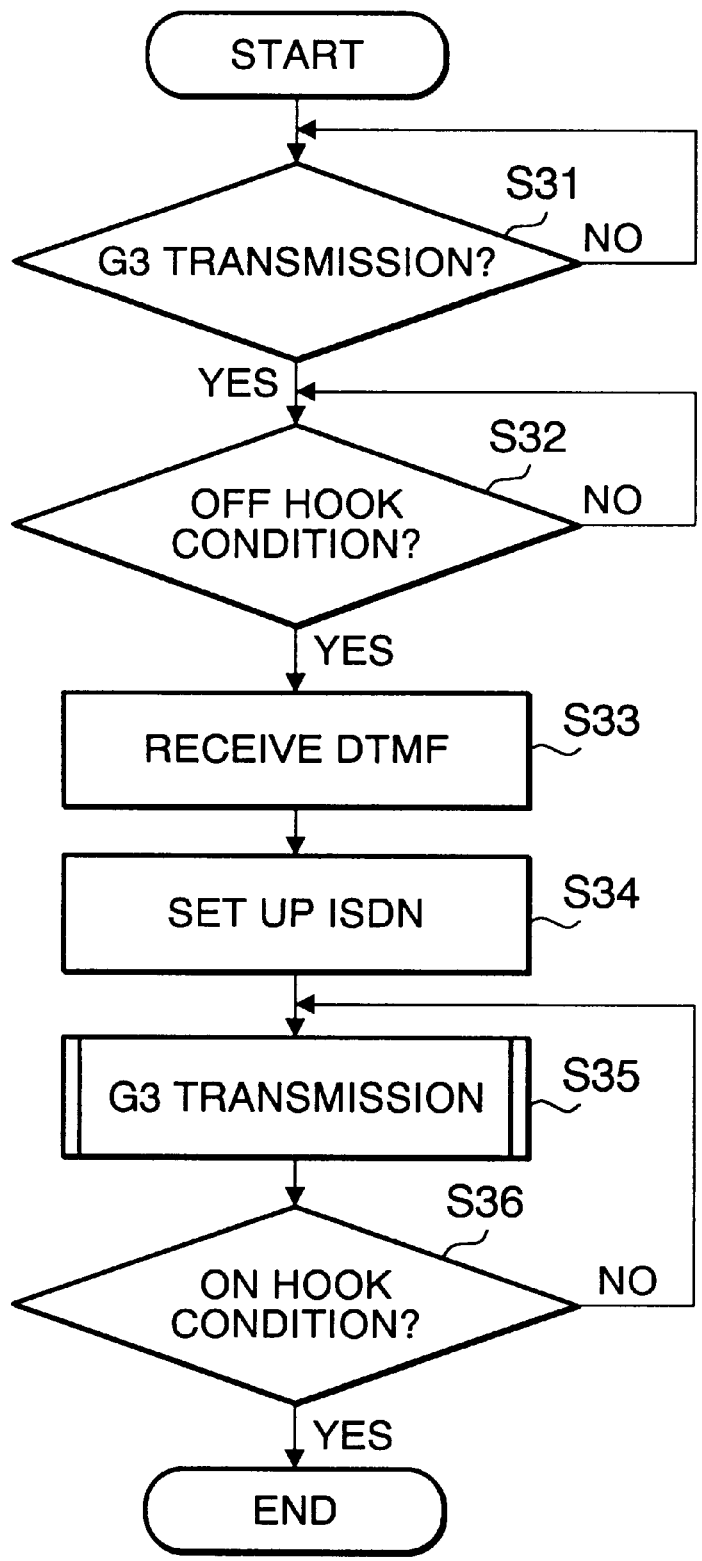
FIG. 3 is a flow chart showing the operating procedure when data is transmitted via G3 facsimile communication through the G4 facsimile adapter of the present invention.

Next, the operation of G3 facsimile transmission using the G4 facsimile adapter 10 of the present embodiment is described in reference to the flow chart in FIG. 3.

First, when a user operates the facsimile machine 1 to send data to a remote device by means of G3 transmission (Step S31 YES), then CPU 13 determines whether or not the facsimile machine 1 is in an off-hook state (Step S32). If it is in an off-hook state, i.e., if it is in a busy condition (Step S32 YES), then the telephone number entered to the G3 facsimile machine 1 by a user is detected by DTMF detecting circuit 34 and CPU 13 receives the detection result (Step S33). CPU 13 then transmits a control signal to the LAP-D unit of the ISDN interface unit 11 to set-up the ISDN 2 (Step S34), and begins G3 facsimile communication (Step S35). This G3 facsimile communication is performed while the facsimile machine 1 is in an off-hook state. When the off-hook state ends (Step S36 YES), the ISDN communication is terminated.

Figure 4:
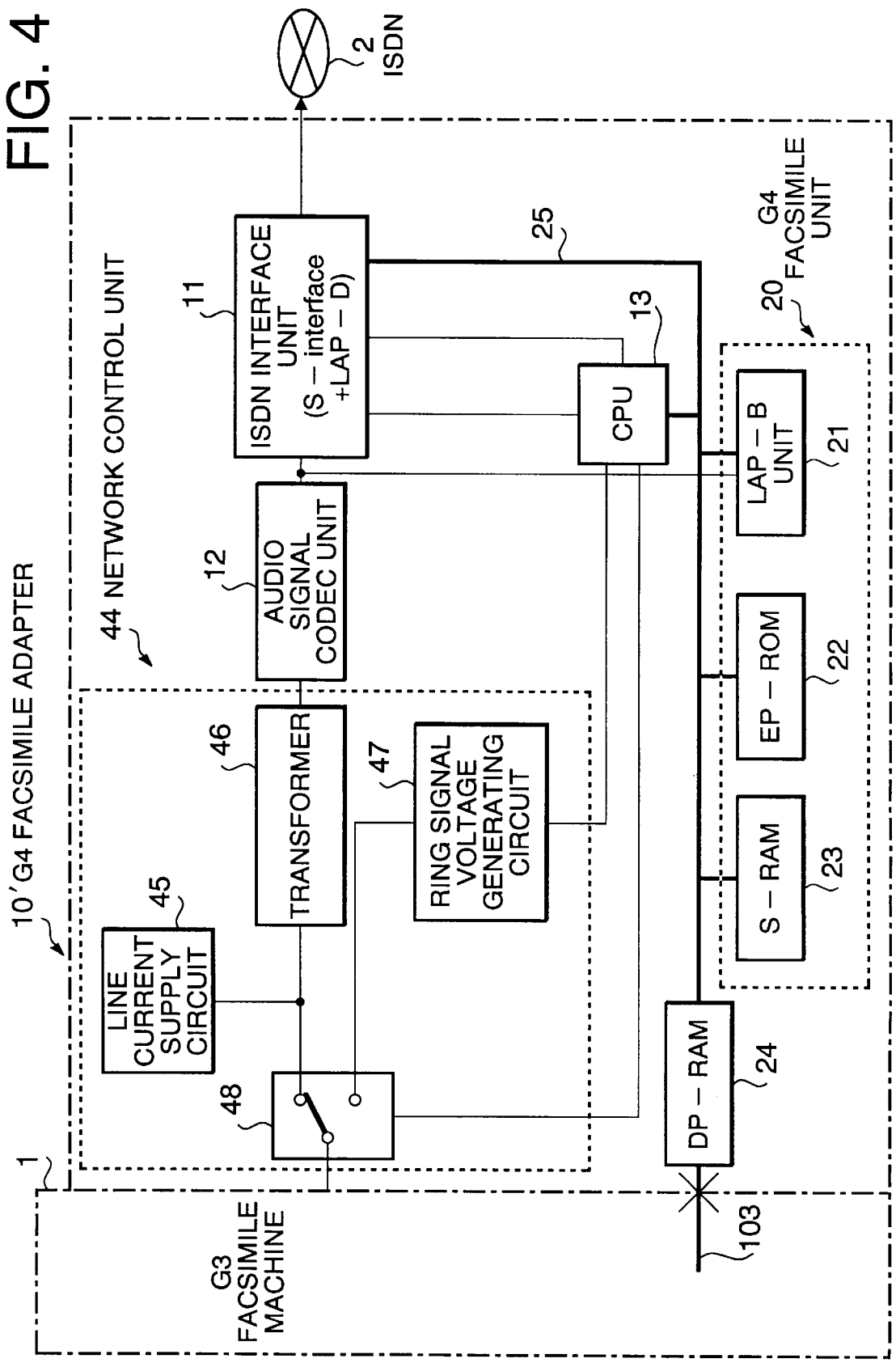
FIG. 4 is a block diagram showing the main structure of a second embodiment of the G4 facsimile adapter of the present invention and the existing G3 facsimile machine to which it is connected.
Figure 5:
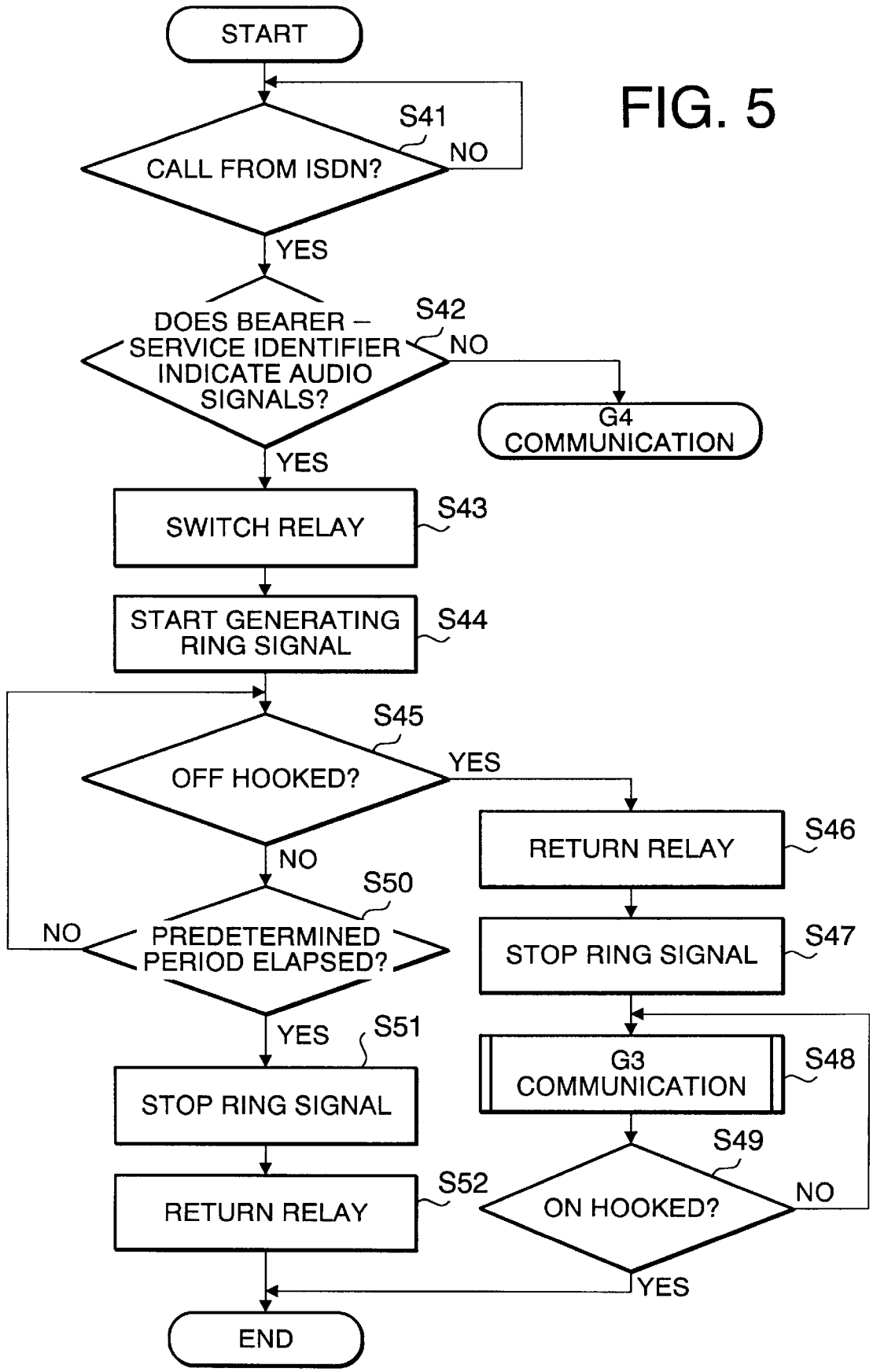
FIG. 5 is a flow chart showing the operating procedure when data is received via G3 facsimile communication through the G4 facsimile adapter shown in FIG.4.
Figure 6:
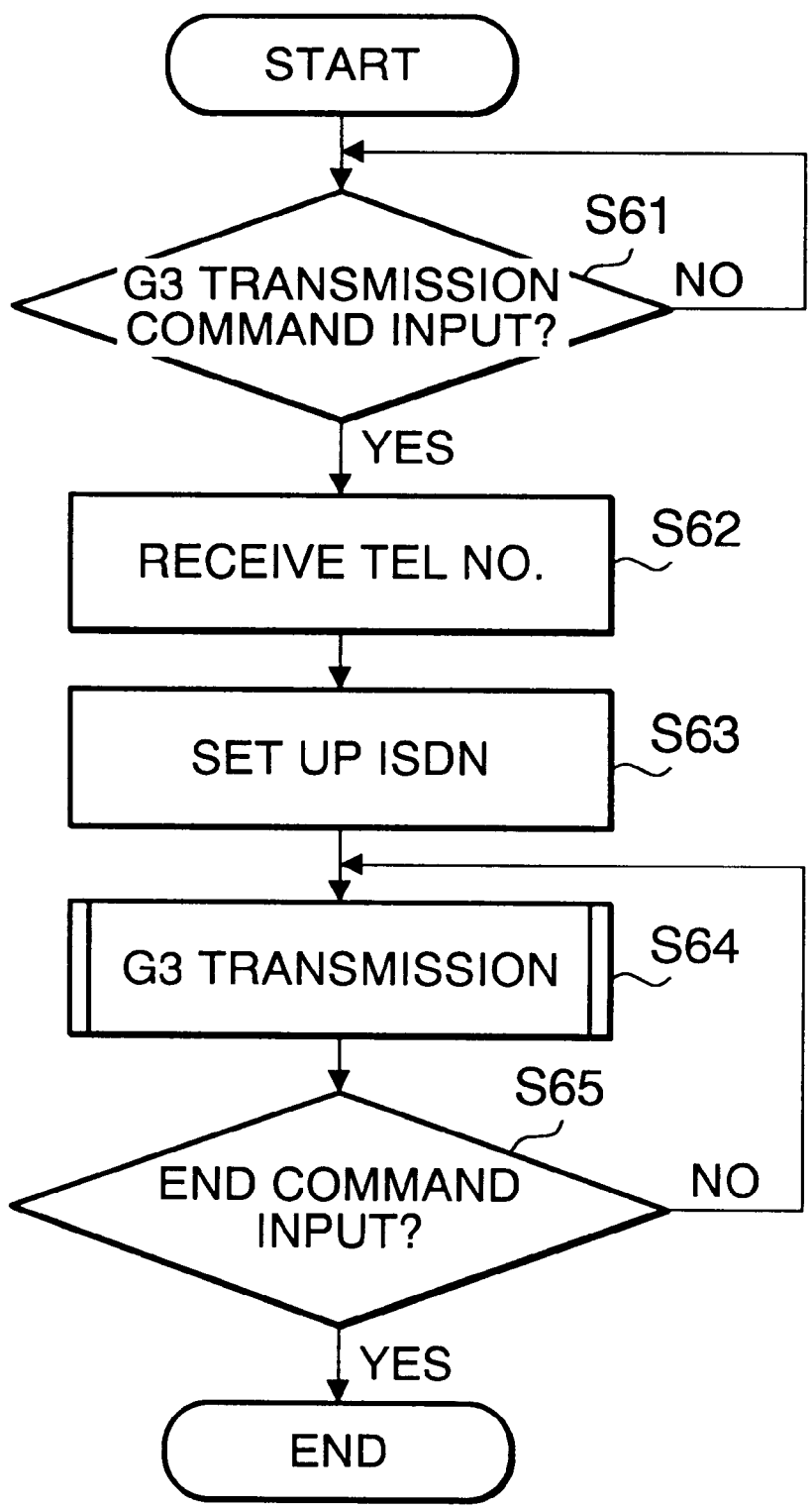
FIG. 6 is a flow chart showing the operating procedure when data is transmitted via G3 facsimile communication through the G4 facsimile adapter shown in FIG.4.
Figure 7:
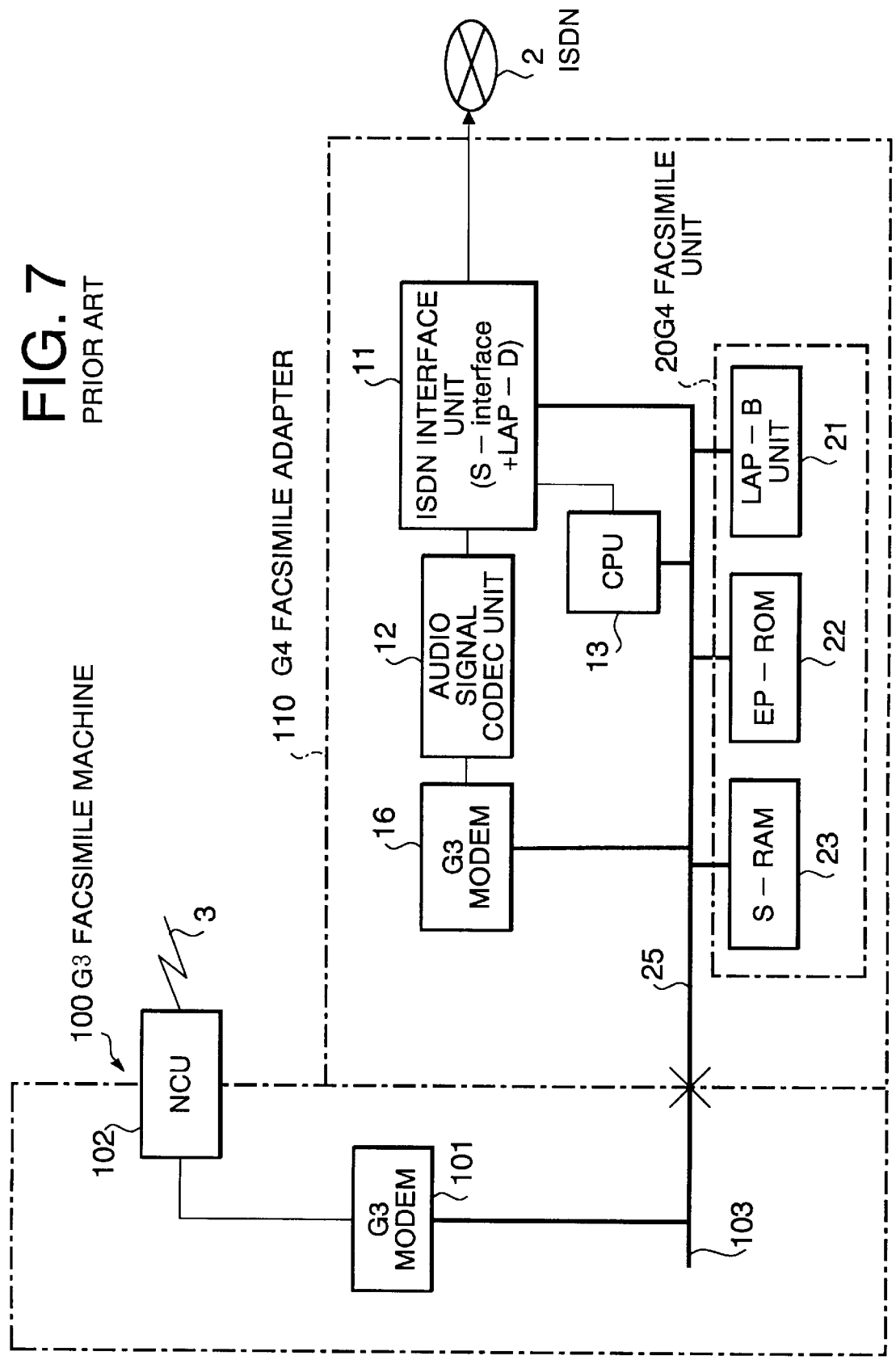
FIG. 7 is a block diagram showing an example of a conventional G4 facsimile adapter and the existing G3 facsimile machine to which it is connected.

Next, a second embodiment of the present invention is described in reference to FIGS. 4 through 6. Structures that are similar to or the same as in the first embodiment have been given the same numbers, and description of these elements have been omitted.

Network Control Unit 44 is comprised of a line current supply circuit 45, a transformer 46, a call signal voltage generating circuit 47 which functions as a ring generating means, and a relay switch 48 which functions as a switching unit. The Relay switch 48 is provided on a line that runs between the G3 facsimile machine 1 and the G4 facsimile adapter 10, and switches the element(s) connected to the G3 facsimile machine 1 between the audio signal CODEC 12 which is connected via the transformer 46 and the ring signal current generating circuit 47. The line current supply circuit 45 is connected to the line running between the relay switch 48 and transformer 46. The line current supply circuit 45 supplies a current required by the line. The transformer 46 distributes the line current to the G3 facsimile machine 1 and the audio signal CODEC unit 12. The ring signal generating circuit 47 generates a ring signal under the control of CPU 13 when a call is received. In the description below, the G3 facsimile machine 1 makes a call as using DTMF tone signals.

In the G4 facsimile adapter 10' of this embodiment, when data is transmitted to a remote device, the telephone number dialed by a user operating the existing G3 facsimile machine 1 is passed through DP-RAM 24 and input into the CPU 13. Consequentially, CPU 13 utilizes the LAP-D unit of the ISDN interface unit 11 to dial the ISDN 2. In the case of G3 communication, the facsimile data is sent from the G3 facsimile machine 1 and passed through the relay switch 48, the transformer 46, the audio CODEC 12, ISDN interface unit 11, and transmitted out to the ISDN 2.

In the case of G4 facsimile communication, data passes between the G3 facsimile machine 1 and the ISDN interface unit 11 through G4 facsimile unit 20. In the meantime, the data is analyzed and constructed into facsimile packets by LAP-B unit 21.

Next, the operation of G3 facsimile reception using the G4 facsimile adapter 10' of the present embodiment is described in reference to the flow chart in FIG. 5. It should be noted that the relay switch 48 normally connects the transformer 46 to the G3 facsimile machine 1 (the upper connection of FIG. 4).

When a call is received over the ISDN 2 (Step S41 YES), CPU 13 first checks for a bearer-service identifier to determine whether or not the incoming data is in the form of audio signals (Step S42). Specifically, it is determined that an audio signal is received if a bearer capability is a 3.1 kHz audio signal or a voice is detected. On the other hand, the incoming call is determined to be G4 signals if the bearer capability is unrestricted. As a result of the determination at step S42, if the received signal is determined to be a signal other than audio signals (Step S42 NO), then It is treated as G4 facsimile communication and processed by CPU 13 at G4 facsimile unit 20.

If it is determined at step S42 that the signals are audio signals (Step S42 YES), then it is treated as G3 facsimile communication, and CPU 13 switches the relay 48 to the ring signal generating circuit 47 (the lower connection in FIG.4; Step S43), sends a control signal to the ring signal generating circuit 47 causing a ring signal (bell sound) to be generated (Step S44).

Next, CPU 13 determines whether G3 facsimile machine 1 is in an off-hook condition or not based on information provided from DP-RAM 24 (Step S45). If it is off-hooked (Step S45 YES) (in other words, if G3 facsimile machine 1 is set to the automatic facsimile reception mode and in a fax stand-by condition or a telephone-fax stand-by condition and off hooks automatically in response to the incoming call signal or if the facsimile machine 1 is set to the manual reception mode and in a telephone standby condition and is off hooked by a user manually), CPU 13 switches the relay 48 back to the transformer 46 (Step S46), and causes the ring signal generating circuit 47 to terminate ring signal generation (Step S47). Next, CPU 13 conducts G3 facsimile communication with the G3 facsimile 1 (Step S48). This G3 facsimile communication is performed while the G3 facsimile machine 1 is being maintained in an off-hook state. When the G3 facsimile machine 1 returns to an on-hook state (Step S49 YES), ISDN communication is terminated.

On the other hand, if the facsimile machine 1 is in an on-hook state at step S45 and the predetermined period elapses (Step S50 YES), CPU 13 causes the ring signal generating circuit 47 to terminate generation of the ring signal (Step S51). CPU 13 then switches the relay 48 back to the transformer 46 (Step S52). If the G3 facsimile machine 1 is not set to the automatic reception mode (in other words, if it is set to dedicated telephone reception), the facsimile reception will not be able to proceed as long as a manual procedure is not performed.

Next, the operation of G3 facsimile transmission using the G4 facsimile adapter 10' of the present embodiment is described in reference to the flow chart in FIG. 6.

When a G3 communication command is input to CPU 13 of the G4 facsimile adapter from the G3 facsimile machine 1 via the bus 103, DP-RAM 24 and the bus 25 (Step S61 YES), the telephone number entered to the G3 facsimile machine 1 by a user is received by CPU 13 via DP-RAM 24 (Step S62). A control signal is then sent to the LAP-D unit of the ISDN interface unit 11, and setting-up of the ISDN 2 is performed (Step S63) to start G3 facsimile communication (Step S64). This G3 facsimile communication continues until an end command is input to CPU 13 from the G3 facsimile machine 1 via DP-RAM 24. When the termination command is received (Step S65 YES), the ISDN communication is terminated.

What is claimed is:

1. A Group 4 facsimile adapter that connects to a facsimile machine which performs Group 3 facsimile communication, the Group 4 facsimile adapter comprising:

an interface unit for interfacing with a digital data line or network;

a Group 4 facsimile communication-capable unit;

an audio signal codec unit for performing conversion between an analog audio signal and digital data between the audio signal codec unit and the digital data line or network; and a network control unit for controlling an analog line or network, wherein the network control unit comprises:
ring signal generating means which outputs a ring signal to the facsimile machine; and
switching means for connecting the facsimile machine to the ring signal generating means when the facsimile machine is in a stand-by condition and for connecting the facsimile machine to the audio signal codec unit when the interface unit detects arrival of a call accompanied with Group 3 facsimile data, the ring signal generating means generates a ring signal, and answering to the ring signal by the facsimile machine is detected via the data bus.

2. The Group 4 facsimile adapter of claim 1, wherein the network control unit comprises:

a ring signal generating means which outputs a ring signal to the facsimile machine;

an off-hook detecting means for detecting an off-hook state of the facsimile machine; and dial detection means for detecting a dialing signal from the facsimile machine, such that when arrival of a call accompanied with Group 3 facsimile data is detected by the interface unit, the ring signal generating means generates a ring signal, and when Group 3 dialing is performed, the interface unit dials the digital line based on a dialing signal detected by the dial detection means.

3. The Group 4 facsimile adapter of claim 1, wherein the facsimile machine sends dialing information to the interface unit via the data bus, the interface unit makes a call to the digital line or network based on the dialing information, and when connection to the digital line or network is established, the switching means switches connection with the facsimile machine from the ring signal generating means to the audio signal codec unit.

4. The Group 4 facsimile adapter of claim 1, wherein the interface unit includes an Integrated Services Digital Network interface having an S interface function and an Link Access Procedure on D-channel function.

5. A Group 4 facsimile adapter that connects to a facsimile machine which performs Group 3 facsimile communication, the Group 4 facsimile adapter comprising:

an interface unit for interfacing with a digital data line or network;

a Group 4 facsimile communication-capable unit, wherein the Group 4 communication-capable unit connects to a data bus of the facsimile machine;

an audio signal codec unit for performing conversion between an analog audio signal and digital data between the audio signal codec unit and the digital data line or network; and a network control unit for controlling an analog line or network, wherein the network control unit comprises:
ring signal generating means which outputs a ring signal to the facsimile machine; and
switching means for connecting the facsimile machine to the ring signal generating means when the facsimile machine is in a stand-by condition and for connecting the facsimile machine to the audio signal codec unit when the interface unit detects arrival of a call accompanied with Group 3 facsimile data, the ring signal generating means generates a ring signal, and answering to the ring signal by the facsimile machine is detected via the data bus.

6. The Group 4 facsimile adapter of claim 5, wherein the facsimile machine sends dialing information to the interface unit via the data bus, the interface unit makes a call to the digital line or network based on the dialing information, and when connection to the digital line or network is established, the switching means switches connection with the facsimile machine from the ring signal generating means to the audio signal codec unit.

7. An apparatus connected to a digital line or network for sending and receiving Group 3 and Group 4 facsimile data over the digital line or network, comprising:

a Group 3 facsimile machine; and a Group 4 facsimile adapter connected between the Group 3 facsimile machine and the digital line or network, the Group 4 facsimile adapter including:

a Group 4 facsimile module;

an interface unit connected between the digital line or network and the Group 4 facsimile module for interfacing with the digital data line or network;

an audio signal codec unit connected between the Group 3 facsimile machine and the interface unit for performing conversion between an analog audio signal and digital data; and a network control unit for controlling an analog line or network, wherein the network control unit includes a bell sound generating circuit for causing the Group 3 facsimile machine to generate a bell when Group 3 facsimile data comes into the Group 4 facsimile adapter from the digital line or network, wherein the network control unit further includes a switch for connecting the Group 3 facsimile machine to the bell sound generating circuit when the Group 3 facsimile machine is in a stand-by condition and for connecting the Group 3 facsimile machine to the audio signal codec unit when Group 3 facsimile data comes into the Group 4 facsimile adapter from the digital line or network.

8. The apparatus of claim 7, wherein the network control unit further includes means for detecting a dialing signal entered from the Group 3 facsimile machine and for causing the interface unit to make a call to the digital line or network based on a detected dialing signal when the Group 3 facsimile machine sends Group 3 facsimile data to the digital line or network via the Group 4 facsimile adapter.

9. The apparatus of claim 7, wherein the interface unit includes an Integrated Services Digital Network interface having an S interface function and an Link Access Procedure on D-channel function.

* * * * *